P. D. & D. E. WERTS.
ANIMAL TRAP.
APPLICATION FILED MAY 10, 1918.

1,288,777.

Patented Dec. 24, 1918.
2 SHEETS—SHEET 1.

WITNESSES

INVENTORS
Perry Daniel Werts
David Elmer Werts
BY
ATTORNEYS

P. D. & D. E. WERTS.
ANIMAL TRAP.
APPLICATION FILED MAY 10, 1918.
1,288,777.
Patented Dec. 24, 1918.
2 SHEETS—SHEET 2.
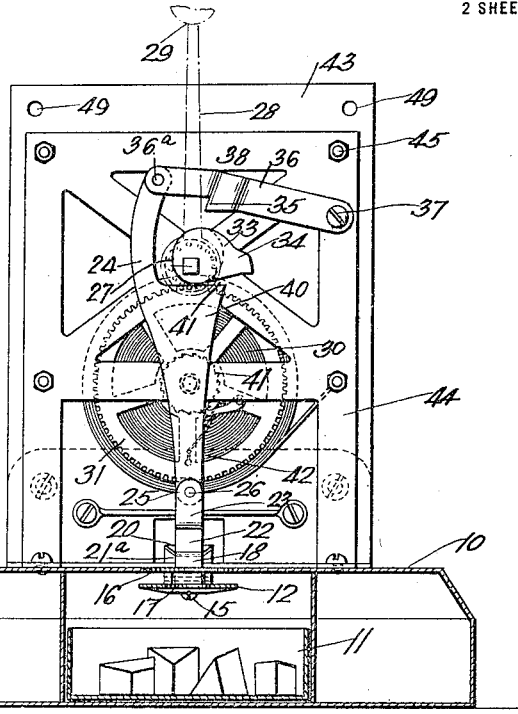
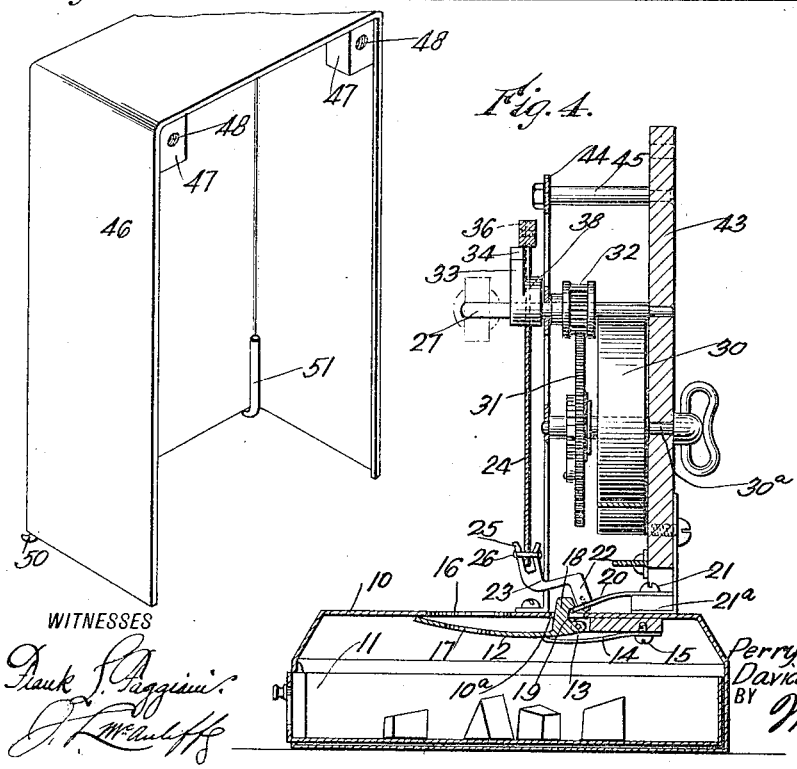
WITNESSES
INVENTORS
Perry Daniel Werts
David Elmer Werts
BY
ATTORNEYS

UNITED STATES PATENT OFFICE.

PERRY DANIEL WERTS, OF BELDING, MICHIGAN, AND DAVID ELMER WERTS, OF OLYMPIA, WASHINGTON.

ANIMAL-TRAP.

1,288,777.  Specification of Letters Patent.  Patented Dec. 24, 1918.

Application filed May 10, 1918. Serial No. 233,672.

*To all whom it may concern:*

Be it known that we, PERRY DANIEL WERTS and DAVID ELMER WERTS, both citizens of the United States, and residents, respectively, of Belding, in the county of Ionia and State of Michigan, and of Olympia, in the county of Thurston and State of Washington, have invented a new and Improved Animal-Trap, of which the following is a description.

Our invention relates to animal traps and is intended more particularly for embodiment in a mouse trap or a rat trap. The invention especially relates to that type of trap in which the animal receives a blow of a hammer upon tripping a trigger and includes automatic resetting mechanism.

Objects of our invention are to provide a trap having improved tripping and resetting means and to insure the prompt delivery of a sufficient blow on the head of the animal by power stored up in a spring.

A more specific object of the invention is to provide a trap of the indicated character of simple and strong construction and to promote convenience in assembling or adjustment of the parts.

Reference is to be had to the accompanying drawings forming a part of this specification it being understood that the drawings are merely illustrative of one example of the invention.

Fig. 3 is a view similar to Fig. 2 but showing the positions of the parts after the animal has pressed the trigger to release the hammer spindle, the view indicating in dotted lines the position of the hammer when being swung to deliver its blow;

Fig. 4 is a transverse vertical section on the line 4—4, Fig. 1, the casing being omitted;

Fig. 5 is a perspective view of the casing.

Figure 1:
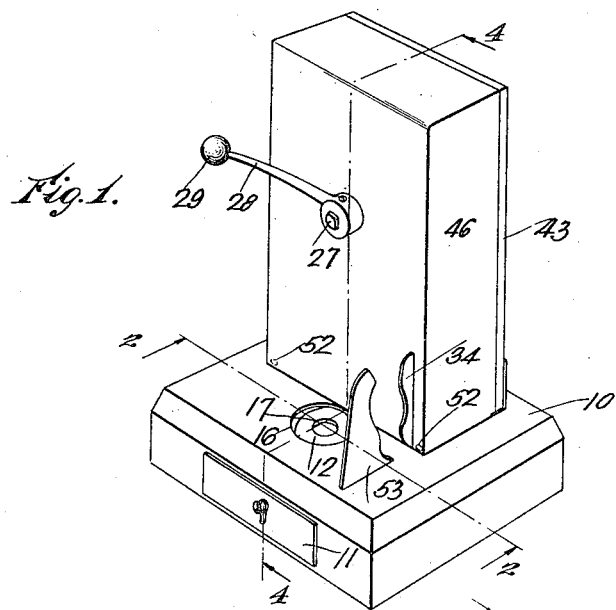
Figure 1 is a perspective view of a trap embodying our invention.

In carrying out our invention in practice in accordance with the illustrated example, a suitable base 10 is provided which is made hollow and is adapted to receive the bait box 11 in the form of a sliding drawer. A trigger 12 is provided in the base beneath the top thereof, pivoted at one end as at 13. A plate spring 14 bears at its free end against the under side of the trigger 12 pressing the same upwardly toward the under side of the top of the base 10, said spring being suitably secured at one end as by a screw 15. The top of the base 10 has an opening 16 and a registering smaller opening 17 is formed in the trigger 12 through which openings the bait in the box 11 will be visible to the animal that he may be tempted to poke his nose downwardly through the opening 16 and against the trigger at the opening 17 in the effort to reach the bait.

The trigger 12 has an upwardly extending catch 18 extending through a hole 10$^a$ in top of the base 10 and is formed with a notch 19 adapted to receive the free end of a plate spring 20 which is suitably secured at one end as by a screw 21 extending through a block 21$^a$ on the top of the base. Connection is established between the spring 20 and a link 24 that controls a hammer release as hereinafter explained in response to the reaction of the spring 20. In the example shown an arm 23 has its inner end 22 secured to the spring 20 and said arm is offset and extended forwardly and upwardly, the upper end of the arm being forked as at 25 to receive the lower end of link 24 to which the fork is secured by a rivet 26.

A transverse spindle 27 carries a hammer 28 which consists of an elongated arm having a preferably round head 29 at its free end. The spindle 27 is adapted to be turned by a coil spring 30, similar to a clock spring. The spindle 30ª to which said spring is secured carries a comparatively large rapidly revolving gear wheel 31 meshing with a pinion 32 on the hammer spindle 27. The spindle 27 is held against being turned by the spring 30 when the trap is set, for which purpose a catch 33 is fast on said spindle to turn therewith and is formed with a nose or catch 34 adapted to be engaged by a shoulder 35 on a latch arm 36 which is pivoted at one end as at 37 to a fixed part of the trap and has its opposite end pivoted as at 36ª to the upper end of the link 24, so that said latch arm will be lifted to release the catch 33 by an upward movement of the link 24 in response to the reaction of the releasing spring 20 and permit the spindle 27 carrying the hammer 28 to be swung by the action of the spring 30 through an arc to deliver its blow.

In order to cause the resetting of the trap we provide a rotary resetting element, the turning of which depresses the spring 20 to engage the catch 18 of the trigger. Preferably, the rotary element is in the form of a cam turning with the hammer spindle 27 and advantageously a cam 38 is formed integral with the catch 34, said cam being best seen in Fig. 3. By the turning of the spindle 27 following the tripping of the trigger, the cam 38 is caused to depress the link 24 for resetting the trap. In the preferred arrangement the link 24 has an enlargement or lateral extension 40 presenting a top edge or surface 41 lying beneath and in the path of cam 38 to be engaged by said cam. Thus, the link 24 in being depressed will swing the latch arm 36 into latching position, and the downward movement of the link 24 simultaneously serves to depress the spring 20.

With the described construction the animal having tripped the trigger 12 to release the spring 20, said spring through the link 24 disengages the latch arm 36 from the nose 34 of the catch 33, thereby permitting said catch and the hammer spindle 27 to be turned by the spindle 30 to cause the hammer 28 to deliver its blow. Similarly, the turning of the cam 38 will reset the trap during the swinging of the hammer through a complete circle to its original position indicated in Figs. 1 and 2.

Figure 2:
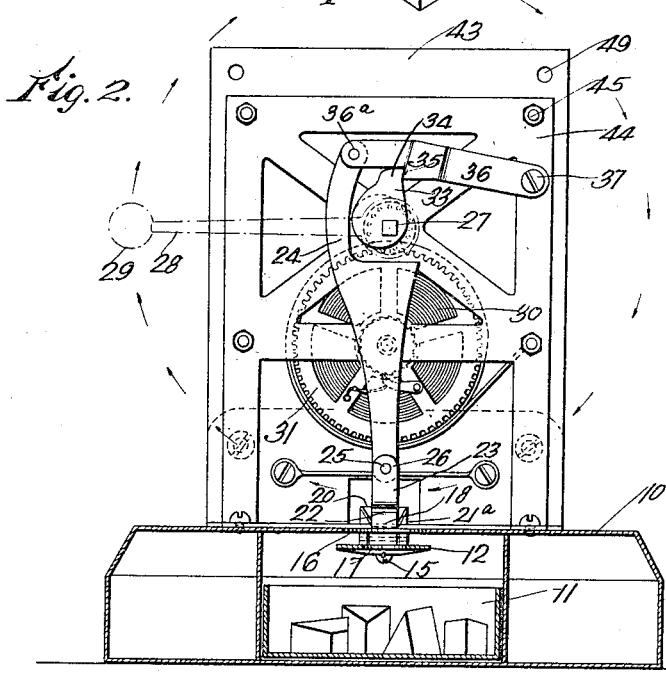
Fig. 2 is a front view with parts in section on the line 2—2, Fig. 1, the casing and hammer being removed, the hammer being indicated in dotted lines, the view showing the positions of the parts when the trap is set.

A clock frame 44 is secured to an upstanding back 43 by suitable bolts 45 in which frame and back the spindles 30ª and 27 have bearings and latch 36 is pivoted to said frame 44. A casing 46 is provided to constitute with the back 43 a housing for the parts above the base 10, said housing being readily removable for which purpose it may be provided at the upper end with blocks 47 having threaded holes 48, there being corresponding registering holes 49 in the back plate 43 to receive screws (not shown). Also, at the lower end the casing 46 has depending hooks 50 which may be produced on the lower ends of shanks 51 secured to the interior of the casing, the hooks being adapted to be engaged in the holes 52 in the top of the base 10 as indicated in Fig. 1.

In order to prevent the animal from approaching his head to the trigger in one direction and thereby to insure the blow being delivered against its head, we provide guards adjacent to the opening 16 at one side, for which purpose an upstanding guard 53 is provided on the base 10 and a co-acting guard member 54 on the front of the casing 46, there being an opening between the guard members sufficient for the free movement of the hammer 28 and its head 29 but not sufficient for the animal to pass his head through. The animal will thus be prevented from taking a position where the hammer might strike a less vital part than his head.

We would state in conclusion that while the illustrated example constitutes a practical embodiment of our invention, we do not limit ourselves strictly to the mechanical details herein illustrated, since manifestly the same can be considerably varied without departure from the spirit of the invention as defined in the appended claims.

Having thus described our invention, we claim as new, and desire to secure by Letters Patent:

1. An animal trap including a power-driven revolubly mounted hammer, a trigger disposed adjacent to the circular path of movement of the hammer, a revoluble catch adapted to be turned with the turning of the hammer, a latch adapted to engage said catch to restrain the catch and hammer, a spring adapted to be engaged by the trigger and held under compression, and connections between said spring and latch to release the catch and hammer by the reaction of the spring.

2. An animal trap including a power-driven revolubly mounted hammer, a trigger disposed adjacent to the circular path of movement of the hammer, a revoluble catch adapted to be turned with the turning of the hammer, a latch adapted to engage said catch to restrain the catch and hammer, a spring adapted to be engaged by the trigger and held under compression, connections between said spring and latch to release the catch and hammer by the reaction of the spring, and a cam mounted to revolve with the turning of the hammer, and adapted to act on said connections to restore the latch and place said spring under tension and in engagement with the trigger.

3. An animal trap including a power-driven revolubly mounted hammer, a trigger, a revoluble catch adapted to be turned with the turning of the hammer, a latch arm adapted to engage said catch, a link pivotally connected at one end with said latch arm, a spring adapted to be engaged and held under compression by the trigger, connections between said spring and that end of the link opposite the latch arm, a revoluble element mounted to turn with the turning of the catch and engage said link to restore the latch and simultaneously place said spring under compression and in engagement with the trigger.

PERRY DANIEL WERTS.

Witnesses to signature of Perry Daniel Werts:

WILLIAM L. CUSSER,
GUY D. WETER.

DAVID ELMER WERTS.

Witnesses as to signature of David Elmer Werts:

J. T. OTIS,
RAY S. BIGELOW.

Copies of this patent may be obtained for five cents each, by addressing the "Commissioner of Patents, Washington, D. C."